United States Patent
Reisch et al.

(10) Patent No.: US 11,215,271 B2
(45) Date of Patent: Jan. 4, 2022

(54) TOOTHING ARRANGEMENT

(71) Applicant: ZF Friedrichshafen AG, Friedrichshafen (DE)

(72) Inventors: Matthias Reisch, Ravensburg (DE); Christoph Erkens, Eschweiler (DE); Eckhardt Lübke, Friedrichshafen (DE); Martin Rattay, Ravensburg (DE); Marc Seeberger, Oberteuringen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/954,782

(22) PCT Filed: Nov. 16, 2018

(86) PCT No.: PCT/EP2018/081611
§ 371 (c)(1),
(2) Date: Jun. 17, 2020

(87) PCT Pub. No.: WO2019/120799
PCT Pub. Date: Jun. 27, 2019

(65) Prior Publication Data
US 2021/0088119 A1  Mar. 25, 2021

(30) Foreign Application Priority Data
Dec. 18, 2017 (DE) ............ 10 2017 223 019.3

(51) Int. Cl.
*F16H 55/17* (2006.01)
*F16H 1/08* (2006.01)
(Continued)

(52) U.S. Cl.
CPC ............ *F16H 55/17* (2013.01); *F16H 1/08* (2013.01); *F16H 57/02004* (2013.01); *F16H 57/08* (2013.01)

(58) Field of Classification Search
CPC ....... F16H 1/08; F16H 57/02004; F16H 55/17
See application file for complete search history.

(56) References Cited

U.S. PATENT DOCUMENTS 3,167,975 A * 2/1965 Durand ............. F16H 57/02004
                                                     74/665 B
5,842,946 A * 12/1998 Ichiki ................... F16H 48/285
                                                     475/252

FOREIGN PATENT DOCUMENTS

| DE | 1215463 A  | 4/1966  |
| DE | 7917319 U1 | 11/1980 |

(Continued)

OTHER PUBLICATIONS

International Search Report (English Translation) PCT/EP2018/081611, dated Jan. 29, 2019.
(Continued)

*Primary Examiner* — Jake Cook
(74) *Attorney, Agent, or Firm* — Dority & Manning, P.A.

(57) ABSTRACT

A toothing arrangement (1) includes at least one first helical-cut spur gear (3) and a second helical-cut spur gear (4), which form a common meshing toothing, and as least one thrust collar (7) with two races (8, 9) for axial load compensation on both sides in the region of the meshing toothing. The annular thrust collar (7) includes an internal gearing (10), which, in the mounted state, is supported in a circumferential groove (11) interrupting the tooth system (5) of the first spur gear (3). At least one rotation prevention means is associated with the thrust collar (7). The rotation prevention means is movable from a radially inner region to a radially outer region of the first spur gear (3) into an interlock position. A transmission may include the toothing arrangement.

12 Claims, 8 Drawing Sheets

(51) Int. Cl.
*F16H 57/02* (2012.01)
*F16H 57/08* (2006.01)

(56) References Cited

FOREIGN PATENT DOCUMENTS

| | | |
|---|---|---|
| DE | 3022020 C2 | 12/1981 |
| DE | 19859273 A1 | 6/2000 |
| DE | 102015210046 A1 * | 12/2016 |
| EP | 0083922 A1 | 7/1983 |
| FR | 1261795 A * | 5/1961 |
| GB | 196566 A * | 10/1923 |

OTHER PUBLICATIONS

German Search Report DE102017223019.3, dated Aug. 13, 2019. (14 pages).

* cited by examiner

TOOTHING ARRANGEMENT

CROSS-REFERENCE TO RELATED APPLICATION

The present application is related and has right of priority to WO Publication No. 2019/120799 filed on Nov. 16, 2018 and to German Patent Application No. 10 2017 223 019.3 filed on Dec. 18, 2017, which are both incorporated by reference in their entirety for all purposes.

FIELD OF THE INVENTION

The present invention relates generally to a toothing arrangement. Moreover, the invention relates generally to a transmission including the toothing arrangement.

BACKGROUND

In present-day gear transmissions, for example, in the drive train for a motor vehicle, helical gears are primarily utilized, for acoustic reasons. In the case of a helical gear, as compared to a spur gear, additional axial loads arise between the gearwheels, which must be supported. These forces are mostly introduced into the housing via the particular shaft bearing. Due to the additional mechanical outlay necessary therefor, disadvantages related to size and costs arise. Moreover, additional bearing losses arise, which adversely affect the efficiency. In order to reduce this problem, there are approaches in which the axial loads are compensated for directly in the region of the gearwheels with the aid of corresponding contact surfaces on thrust collars.

For example, publication DE 30 22 020 C2 describes an axial power transmission mechanism for a spur gear drive. The spur gear drive includes two mutually engaging spur gears, which include an oblique toothing as common meshing toothing. In the case of one of the spur gears, a circumferential groove interrupting the tooth system is provided. A thrust ring or an annular thrust collar including two races for absorbing axial loads on both sides is arranged in the groove. For the purpose of assembly, the thrust collar includes an internal gearing, which corresponds to the tooth system of the spur gear in such a way that the thrust collar including the internal gearing can be axially slid onto the tooth system of the spur gear, in order to be brought into the central groove of the spur gear. The thrust collar is turned by half a pitch module with respect to the spur gear in order to establish an axial interlock. In order to prevent an undesirable turning of the thrust collar, it is provided in the case of the known spur gear drive that a pin is guided radially from the outside through the thrust collar. The pin protrudes into a tooth gap of the tooth system of the spur gear.

It has been shown, in the case of such a rotation prevention mechanism, that the thrust collar is disadvantageously mechanically weakened. In addition, the pin is to be appropriately dimensioned, in order to ensure that the torsional forces which occur are absorbed.

SUMMARY OF THE INVENTION

Example aspects of the present invention provide a toothing arrangement as well as a transmission including the toothing arrangement of the type described at the outset, which ensure, in a structurally simple and reliable way, that a thrust collar is secure against rotation.

Accordingly, a toothing arrangement is provided, including at least one first gearwheel, which is helical-cut at least partially or in sections, in particular a spur gear, and a second spur gear, which is helical-cut at least partially oo in sections. The first gearwheel and the second spur gear form a common meshing toothing. Moreover, the toothing arrangement includes at least one thrust collar with two races for axial load compensation on both sides in the region of the meshing toothing of the gearwheels. The annular thrust collar is designed with an internal gearing, or the like, which, in the mounted state, is supported in a circumferential groove interrupting the tooth system of the first spur gear, and at least one rotation prevention means is associated with the thrust collar. In order to design a particularly cost-effective and reliable rotation prevention means, it is provided that the rotation prevention means is movable from a radially inner region to a radially outer region of the first spur gear into the interlock position and/or acts in an interlocking manner.

In this way, a toothing arrangement is provided, which includes a thrust collar, which can be particularly easily axially slid onto the gearwheel or spur gear via the internal gearing, which is preferably also helical-cut, and, in the mounted state, can absorb axial loads in both directions of the meshing toothing with the aid of the axially situated races. As a result, only a small amount of axial play results, if at all. Due to the rotation prevention means provided according to example aspects of the invention, which is brought into the interlock position and/or operative position practically at least from the radially inner region to the radially outer region in the associated gearwheel, a particularly cost-effective and compact toothing arrangement is implemented. In particular, only a few components are necessary and radial installation space is saved.

Regardless of the specific structural design of the rotation prevention means, it is provided that the rotation prevention means, in the interlock position, engages out of the groove base of the groove of the first spur gear radially outward into the inner toothing of the thrust collar in a form-locking or interlocking manner. As a result, the thrust collar is, advantageously, not mechanically weakened. The rotation prevention means therefore acts in the associated spur gear, via a movement from a radially inner region to a radially outer region into the interlock position. The circumferential groove provided on the spur gear is therefore utilized not only for accommodating and centering the thrust collar, but additionally for implementing the rotation prevention. The groove base of the associated gearwheel therefore forms the centering diameter for the tip circle diameter of the thrust collar. In this case, the groove base diameter of the associated gearwheel or spur gear is greater than its root diameter, in order to achieve the desired centering. The groove base diameter is therefore a diameter interrupted by the tooth system.

A particularly simple approach of the idea according to example aspects of the invention is achieved due to the fact that the rotation prevention means includes at least one interlocking element and at least one detent for holding the interlocking element in the interlock position. For example, it is also possible that the interlocking element and the detent practically have a one-piece design as a screw, for example, a grub bolt, or the like. The possible structural designs of the interlocking element and the detent are therefore diverse. A pin-shaped, sleeve-shaped, or similarly designed interlocking element appears to achieve the objective, in particular, wherein the detent can be implemented, for example, via a spring, a snap ring, or via another component associated with the gearwheel, for example, from a radially inward region. The interlocking element and the detent can be provided in an arbitrarily configured radial bore or through hole in the associated gearwheel. The at least one radial bore or at least one through hole for accommodating the rotation prevention means can be arranged, for example, perpendicularly with respect to the longitudinal axis of the first spur gear from the radially inner region to the radially outer region in the first spur gear. It is also entirely possible that the radial bore or through hole extends at a predetermined angle obliquely from the radially inner region to the radially outer region in or through the gearwheel, respectively. In contrast to the perpendicular alignment of the radial bore or through hole, the predetermined angle is greater than or less than ninety degrees (90°), so that an oblique extension of the radial bore or through hole in or through the gearwheel, respectively, is implemented.

Within the scope of one advantageous example refinement of the invention, it is provided that, in the interlock position of the interlocking element, a predetermined radial distance is provided between the end of the interlocking element facing the thrust collar and the root circle of the internal gearing of the thrust collar. As a result, for a possible disassembly, the interlocking element and/or the rotation prevention means can be particularly easily grasped, in order to move the interlocking element radially inward.

Regardless of the specific designs, it is provided that multiple rotation prevention means, which are distributed over the circumference of the thrust collar, are associated with the toothing arrangement provided.

Moreover, any type of transmission of a vehicle may include at least one toothing arrangement according to example aspects the invention.

BRIEF DESCRIPTION OF THE DRAWINGS

Example aspects of the present invention are explained in greater detail in the following with reference to the drawings. Wherein.

DETAILED DESCRIPTION

Figure 1:
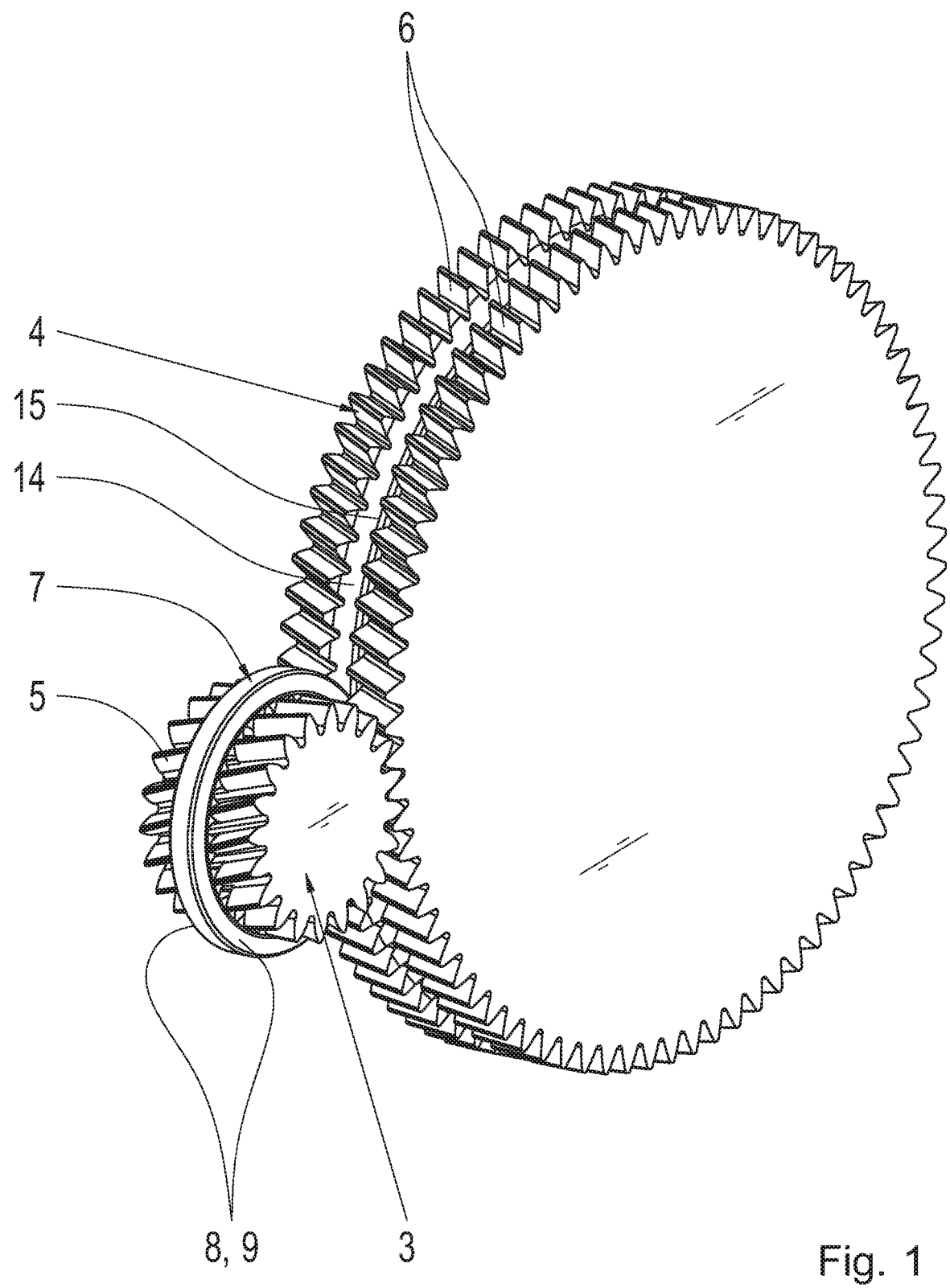
FIG. 1 shows a three-dimensional view of a toothing arrangement according to example aspects of the invention including a thrust collar, on the basis of gearwheels designed as spur gears.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

In FIGS. 1 through 12, various views of a toothing arrangement 1 according to example aspects of the invention are represented, by way of example, for the application in any type of transmission 2.

The toothing arrangement 2 according to example aspects of the invention includes, in the embodiments represented by way of example, a first helical-cut spur gear 3 and a second helical-cut spur gear 4, which form, via their tooth systems 5, 6, a common rotating meshing toothing. Moreover, at least one thrust collar 7 is provided, which includes two axially situated races 8, 9 for axial load compensation on both sides in the region of the meshing toothing. The closed, annular thrust collar 7 includes an internal gearing 10 on the inner diameter. In the mounted state, the thrust collar 7, via the internal gearing 10, is accommodated in a circumferential groove 11 interrupting the tooth system 5 of the first spur gear 3, as is apparent, in particular, from FIGS. 1 and 2.

The thrust collar 7 includes at least one rotation prevention means, the specific example embodiments of which are the object of FIGS. 3 through 12. The rotation prevention means holds the thrust collar 7 in an intended position. According to example aspects of the invention, it is provided that the rotation prevention means is designed in such a way that the rotation prevention means is movable in the first spur gear 3 essentially from a radially inward region, radially outward into the operative or interlock position.

FIG. 1 shows a perspective view of the toothing arrangement, in which the thrust collar 7 has been turned, with respect to the first spur gear 3, in the groove 11 by half a tooth and, as a result, can transmit an axial load in both directions. The races 8, 9 of the thrust collar 7 transmit the axial loads onto the corresponding mating surfaces 14 in a recess 15 interrupting the tooth system 6 of the second spur gear 4. The mating surfaces 14 of the second spur gear 4 are located radially below a root diameter of the second spur gear 4. The meshing toothing of the two spur gears 3, 4 are located on both sides of the thrust collar 7. The addendum modification of the meshing toothing is selected in such a way that the contact radius is situated close to the pitch radius. As a result, the losses at the contact point and/or at the contact surface of the thrust collar 7 are minimized. The geometry of the races 8, 9 of the thrust collar 7 as well as the corresponding mating surfaces 14 of the second spur gear 4 correspond, at least approximately, to the lateral surface of a truncated cone. A crowning is superimposed on the conical shape. The first spur gear 3 and the second spur gear 4 can be designed, for example, in a one-piece or even multiple-piece manner with a shaft. Depending on the example embodiments, it is possible that one of the two spur gears 3, 4 is designed as an engageable idler gear, which does not include a separate axial bearing. The thrust collar 7 which is provided can also be utilized in a gear transmission including one or multiple gearwheel(s). Therefore, the thrust collar 7 and the groove 11 are utilized multiple times. Multiple gearwheels including a thrust collar 7 and/or a groove 11 and rotating about the same axis can also be arranged next to one another.

Figure 2:
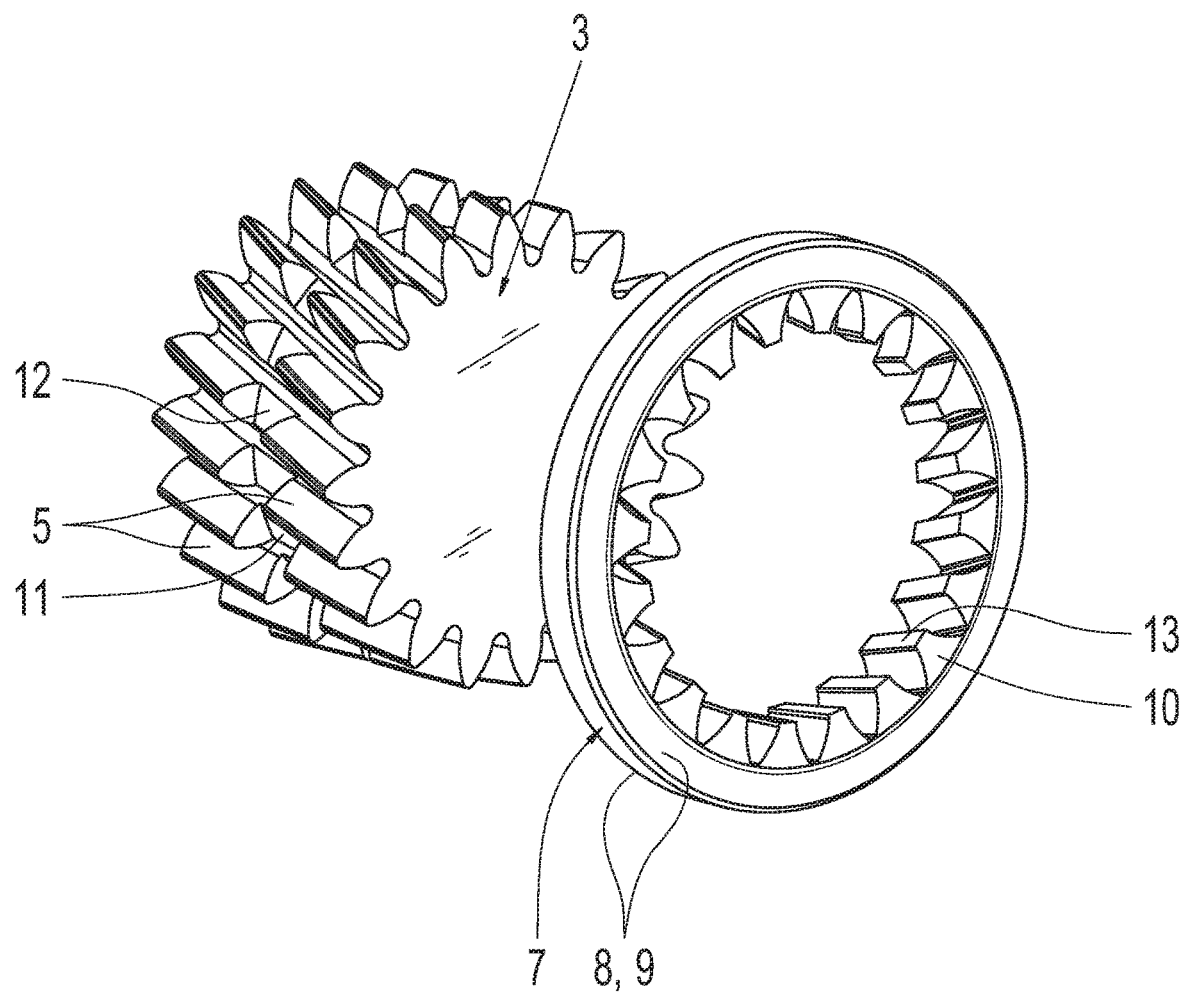
FIG. 2 shows a three-dimensional view of one of the spur gears of the toothing arrangement including the thrust collar before mounting.

In FIG. 2, the first spur gear 3 and the thrust collar 7 are represented before assembly. In this representation, the centering diameter 12 of the first spur gear 3 is apparent, on which the tip diameter 13 of the internal gearing 10 of the thrust collar 7 is centered. In order to mount the thrust collar 7, the thrust collar, via the internal gearing 10, is slid onto the tooth system 5 of the first spur gear 3 until the thrust collar is centered in the groove 11 between the tooth system 5 interrupted by the groove 11. Thereafter, the thrust collar 7 is turned approximately by half a pitch module with respect to the spur gear 3. Finally, the rotation prevention means is activated and the thrust collar 7 is completely mounted.

Figure 2A:
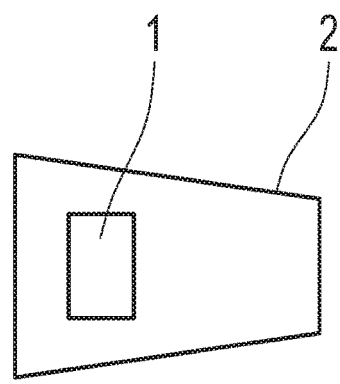
FIG. 2A shows a purely diagrammatic view of a transmission including the toothing arrangement.

In FIG. 2A, a transmission 2 of any type, for example, for vehicles, is diagrammatically indicated, which includes the toothing arrangement 1 according to example aspects of the invention, and therefore shows one possible application.

Figure 3:
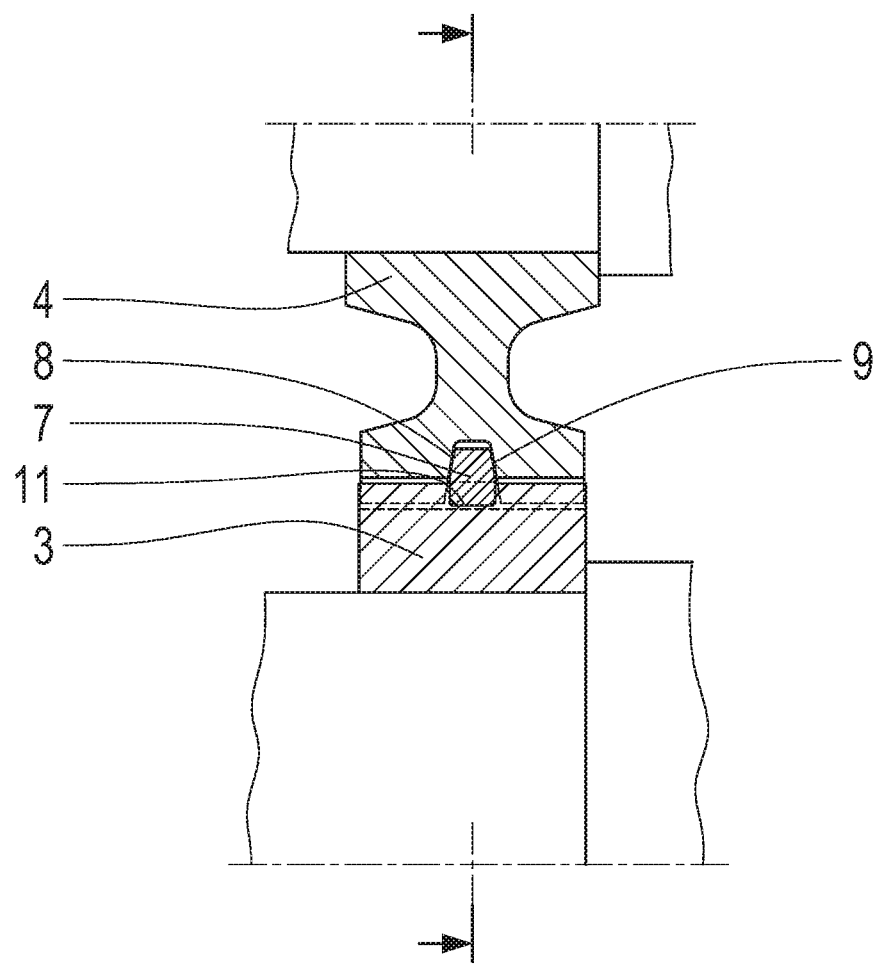
FIG. 3 shows an exposed partial view of the toothing arrangement.

FIG. 3 shows an exposed partial view of the toothing arrangement according to example aspects of the invention, in which the thrust collar 7 is represented in installation positions. In order to be able to mount the thrust collar 7, the tooth gaps of the internal gearing 10 of the thrust collar 7 are brought into alignment with the teeth of the tooth system 5 of the first spur gear 3, so that an axial movement is possible. In order to illustrate the mode of operation, spur teeth are shown at this point. In the case of oblique toothing, the mounting of the thrust collar 7 therefore takes place with the aid of an axial and turning motion, i.e., with the aid of a screwing motion. The thrust collar 7 includes bearing races and/or races 8, 9 on both sides with respect to the spur gears 3, 4. As a result, the rotation prevention also remains effective during a reversal of the direction of the axial load.

Figure 4:
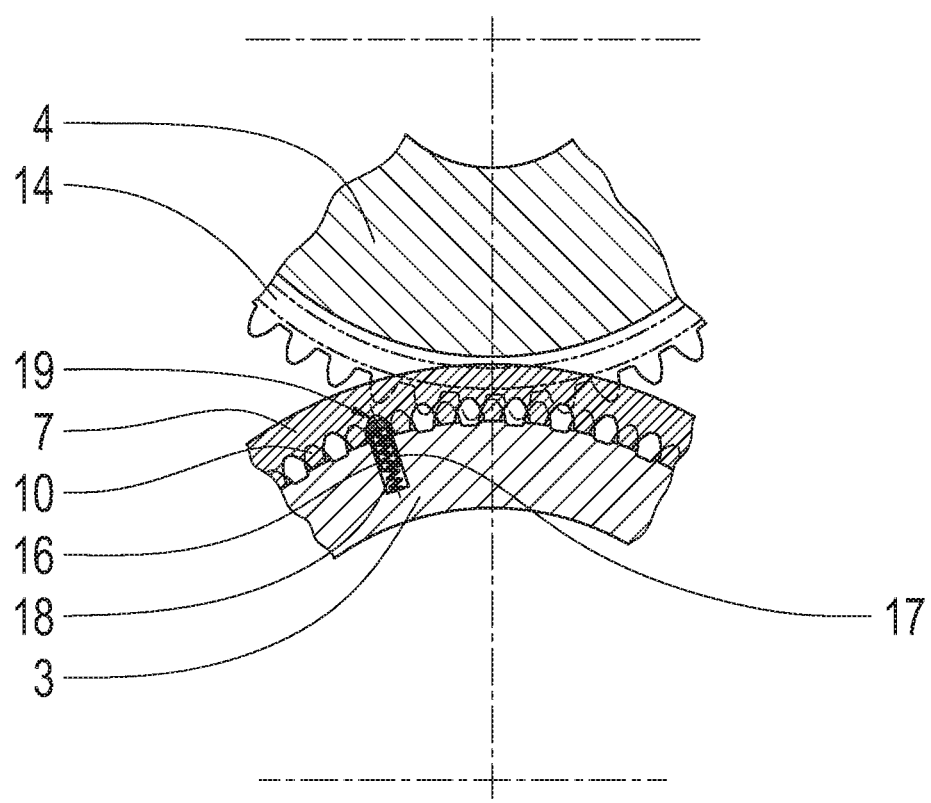
FIG. 4 shows a cross-sectional view of a first example embodiment of a rotation prevention means of the thrust collar of the toothing arrangement.

In FIG. 4, a first example embodiment of a rotation prevention means is represented, by way of example, on the basis of the toothing arrangement. As the interlocking element of the rotation prevention means, a sleeve 17 arranged in a radial bore 16 of the first spur gear 3 is provided, which is movable, as a detent, radially outward into the interlock position of the thrust collar 7. In the interlock position, a predetermined radial distance 19 remains between the end of the interlocking element, or the sleeve 17, facing the thrust collar 7 and the root circle of the internal gearing 10 of the thrust collar 7. In this example embodiment, in order to mount the thrust collar 7, the sleeve 17, as the interlocking element, is pressed radially inward against the spring element 18 as a detent. When the thrust collar 7 is turned in the direction of the installation position, the spring element 18 relaxes and brings the sleeve 17, radially outward, into the interlocking operative position. The radial bore 16 for accommodating the rotation prevention means is designed as a blind hole and extends, from a radially inner region to a radially outer region of the first spur gear 3, perpendicularly with respect to an axis of rotation and/or longitudinal axis of the first spur gear 3. In order to remove the thrust collar 7, it is necessary to press the sleeve 17 radially inward against the spring force. This is facilitated by the radial distance 19, since engagement can take place here with the aid of an auxiliary tool.

Figure 5:
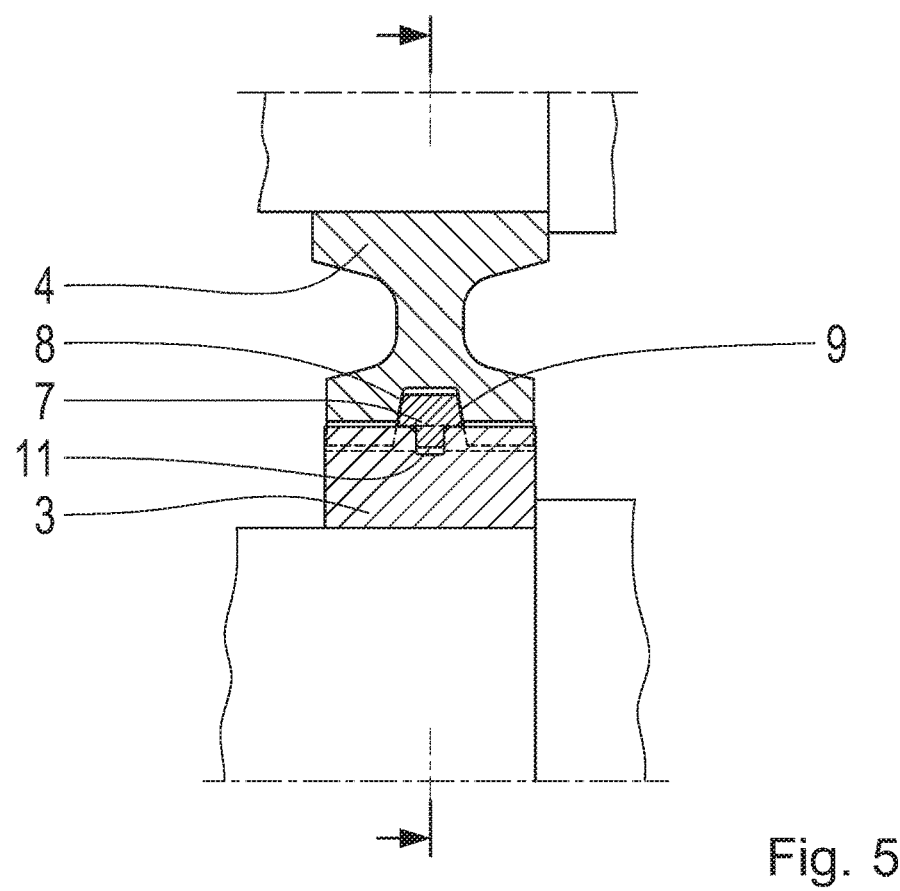
FIG. 5 shows a longitudinally exposed view of the toothing arrangement comprising an alternative example embodiment of the thrust collar.

In FIG. 5, in deviation from FIG. 3, one further example embodiment variant of the thrust collar 7 is centered with the aid of laterally situated shoulders on the addendum circle of the associated first spur gear 3. Due to this feature, the load on the thrust collar 7 decreases and allows for greater axial loads, although more axial installation space is necessary. It is possible to perform the centering on one side. This approach can allow for a more favorable size when there is a preferred direction of torque.

Figure 6:
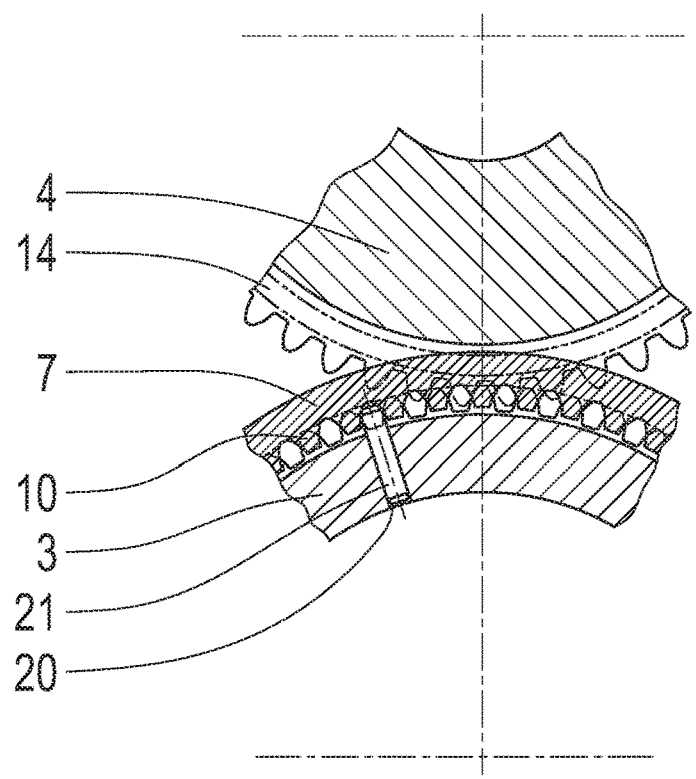
FIG. 6 shows a cross-sectional view of a second example embodiment of the rotation prevention means of the thrust collar of the toothing arrangement.

In FIG. 6, a second example embodiment of the rotation prevention means is represented. In this example embodiment, the first spur gear 3 includes a shaft receptacle and/or shaft passage, wherein the first spur gear 3 includes a radial through hole 20 for accommodating a pin 21 as an interlocking element, the length of which is dimensioned in such a way that, after the spur gear 3 has been mounted on a shaft, the pin 21 is provided as a detent in the interlock position. For this purpose, the pin 21 is moved through the shaft, from a radially inner region to a radially outer region of the first spur gear 3, into the interlock position. In the second example embodiment, the pin 21 is inserted into the first spur gear 3 from a radially inward position. After the first spur gear 3 has been mounted on the shaft, the pin 21 is secured radially inward by the shaft against falling out, in a form-locking manner. Alternatively, the pin 21 can also be secured in a force-locking, form-locking, or integrally bonded manner. The through hole 20 for accommodating the rotation prevention means extends, from a radially inner region to a radially outer region, through the first spur gear 3, perpendicularly with respect to an axis of rotation or longitudinal axis of the first spur gear 3.

Figure 7:
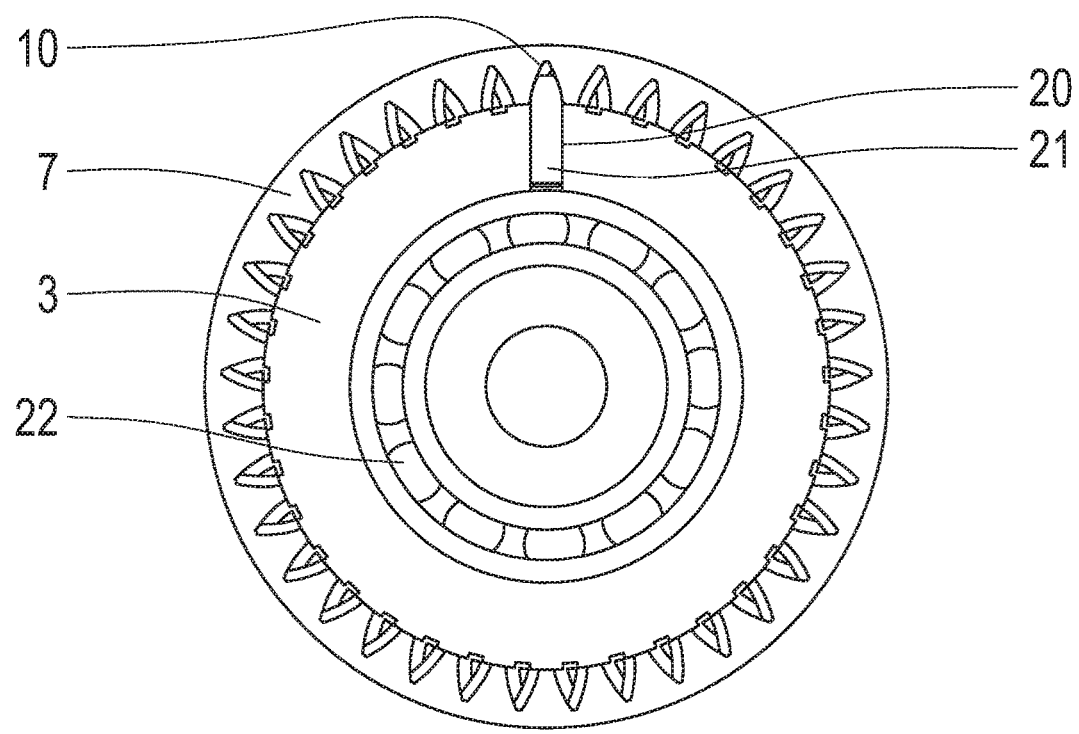
FIG. 7 shows a cross-sectional view of a third example embodiment of the rotation prevention means of the thrust collar of the toothing arrangement.
Figure 8:
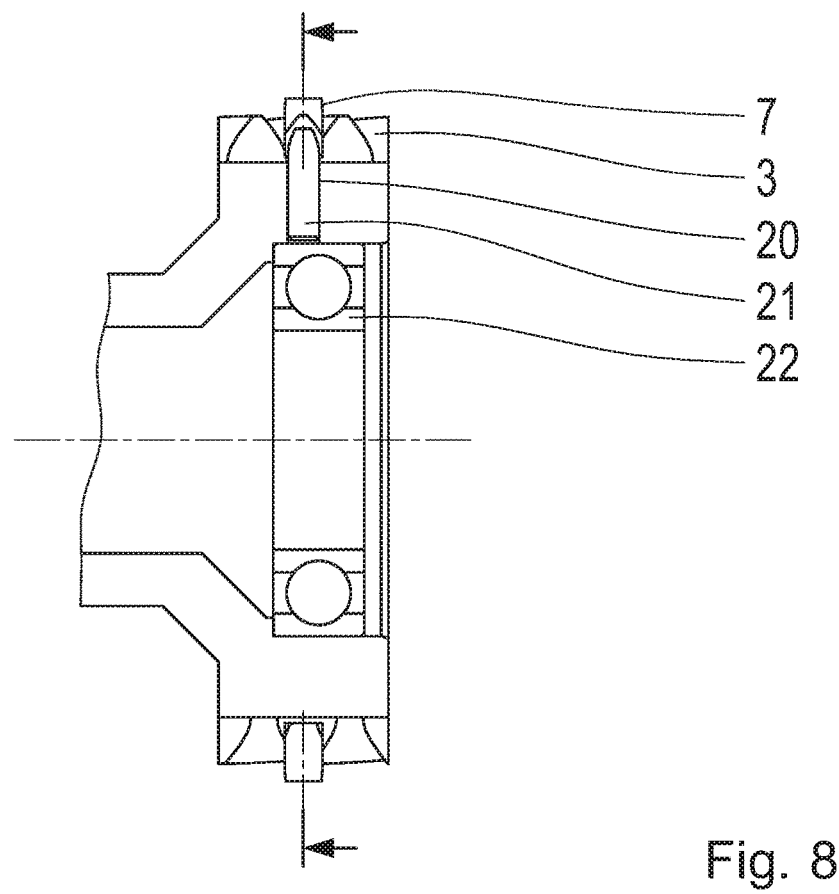
FIG. 8 shows a longitudinally exposed view of the third example embodiment of the rotation prevention means of the thrust collar of the toothing arrangement.

In FIGS. 7 and 8, a third example embodiment of the rotation prevention means is shown, in which, once again, a through hole 20 is provided for accommodating a pin 21 as an interlocking element. However, the positive engagement takes place radially inward, in contrast to the second example embodiment, with the aid of a bearing 22. The pin 21 is moved radially outward, from a radially inward position, into the interlock position after the thrust collar 7 has reached the final angular position. After the bearing 22 has been mounted, the pin 21 is secured or arrested. The detent takes place via the bearing 22.

Figure 9:
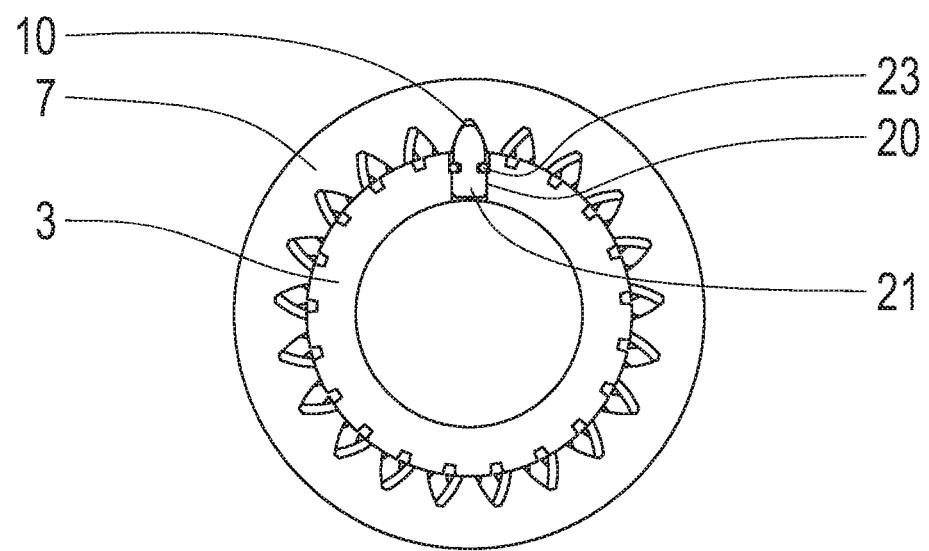
FIG. 9 shows a cross-sectional view of a fourth example embodiment of the rotation prevention means of the thrust collar of the toothing arrangement.
Figure 10:
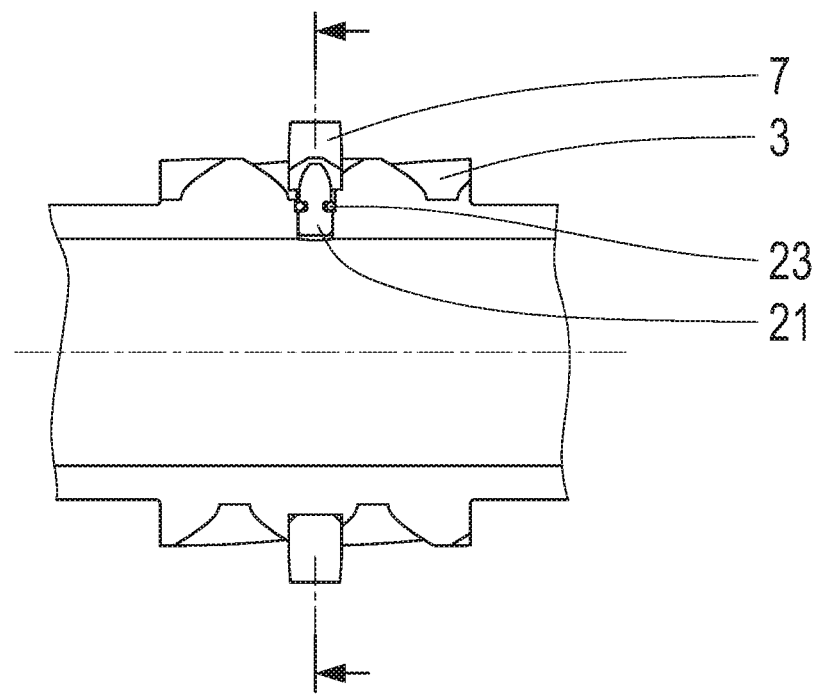
FIG. 10 shows a longitudinally exposed view of the fourth example embodiment of the rotation prevention means of the thrust collar of the toothing arrangement.

In FIGS. 9 and 10, a fourth example embodiment of the rotation prevention means is represented, in which a pin 21 provided in a radial bore 16 or a through hole 20 is provided, once again, as an interlocking element and includes, for example, a snap ring 23 as a detent. This example embodiment is particularly useful when a retention according to FIGS. 6 and/or 7 and 8 is not possible, because a rotating shaft or another component extends in the interior and the wall thickness of the first spur gear 3 does not suffice for implementing a spring-based approach. The radial bore 16 or the radial through hole 20 has a greater diameter radially outward than radially inward, for example, due to a groove or step. As a result, the snap ring 23 can secure the pin 21 radially inward against falling out via a spreading effect of the snap ring 23.

Figure 11:
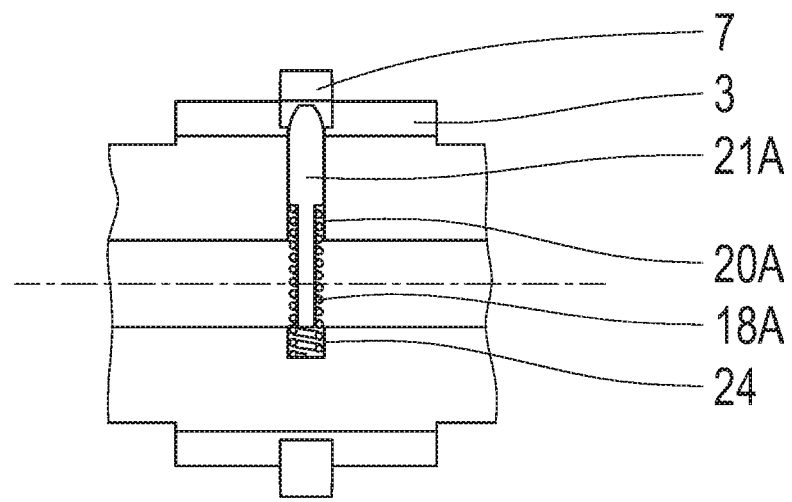
FIG. 11 shows a longitudinally exposed view of a fifth example embodiment of the rotation prevention means of the thrust collar of the toothing arrangement.

In FIG. 11, a fifth example embodiment of the rotation prevention means is represented, in which a pin 21A provided in a through bore 20A is provided as an interlocking element, wherein associated with the through hole 20A is an opposed indentation 24 for accommodating a spring element 18A as a detent, which preloads the pin 21A in the interlock position. This example embodiment is suitable, in particular, for the case in which a tooth system is situated directly on a shaft having a relatively small diameter and a bore, for example for guiding oil, is located in the interior of the shaft. The basic idea corresponds to the first example embodiment. The difference is that the spring element 18A rests directly against the opposite side or in an indentation 24, as shown.

Figure 12:
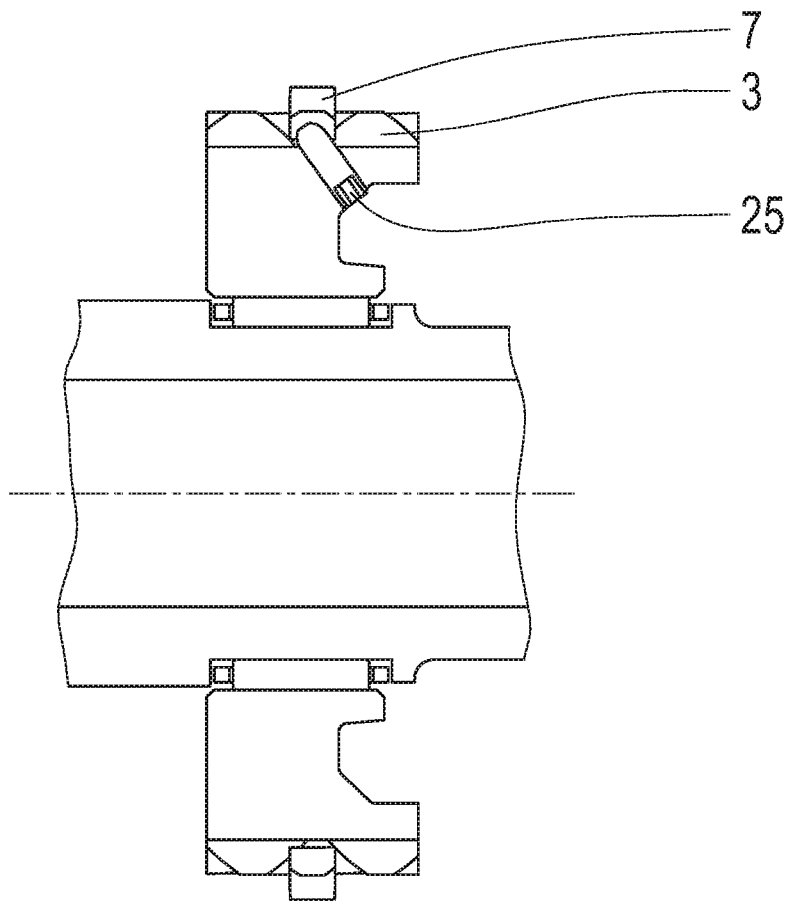
FIG. 12 shows a longitudinally exposed view of a sixth example embodiment of the rotation prevention means of the thrust collar of the toothing arrangement.

FIG. 12 shows, by way of example, a sixth example embodiment of the rotation prevention means, in which the radial bore 16 or through hole 20, 20A is arranged in the first spur gear 3 at a predetermined angle obliquely from a radially inner region to a radially outer region. This example embodiment is suitable, in particular, for the case in which a spring-based approach is not possible, for example, due to insufficient radial installation space, and a snap ring-based approach is not permissible, since a through hole 20, 20A must not be present radially inward. This is the case, for example, when there is an oil pressure in the interior or an antifriction bearing race is provided, as shown. In deviation from the previous approaches, the rotation prevention means is mounted from an obliquely inward position toward a radially outward position. Regardless thereof, in this example embodiment, the rotation prevention means is designed as a grub bolt 25. Another one of the example embodiments shown so far can also be utilized in this case. A rotation prevention means designed as a screw can also be utilized in the case of a purely radial assembly.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 1 toothing arrangement
2 gear
3 first spur gear or gearwheel
4 second spur gear or gearwheel
5 tooth system of the first spur gear
6 tooth system of the second spur gear
7 thrust collar
8 race
9 race
10 internal gearing
11 groove of the first spur gear
12 centering diameter
13 tip circle diameter of the internal gearing
14 mating surfaces of the second spur gear
15 recess of the second spur gear
16 radial bore
17 sleeve
18, 18A spring element
19 radial distance
20, 20A radial through hole
21, 21A pin
22 bearing
23 snap ring
24 indentation
25 grub bolt

The invention claimed is:

1. A toothing arrangement (1), comprising:
    at least one first helical-cut spur gear (3);
    a second helical-cut spur gear (4) forming a common meshing toothing with the first helical-cut spur gear (3); and
    at least one thrust collar (7) with two races (8, 9) for axial load compensation, each of the two races (8, 9) positioned on a respective side of the thrust collar (7) proximate the meshing toothing, the thrust collar (7) including an internal gearing (10) that is supported in a circumferential groove (11) of the first spur gear (3) when the thrust collar (7) is mounted to the first spur gear (3), the circumferential groove (11) interrupting a tooth system (5) of the first spur gear (3),
    wherein at least one rotation prevention means is associated with the thrust collar (7), and the rotation prevention means is movable from a radially inner region to a radially outer region of the first spur gear (3) into an interlock position.

2. The toothing arrangement (1) of claim 1, wherein, in the interlock position, the rotation prevention means engages out of a groove base of the groove (11) of the first spur gear (3) radially outward into the internal gearing (10) of the thrust collar (7) in an interlocking manner.

3. The toothing arrangement (1) of claim 1, wherein the rotation prevention means comprises at least one interlocking element and at least one detent for holding the interlocking element in the interlock position.

4. The toothing arrangement (1) of claim 1, wherein at least one radial bore (16) or at least one through hole (20, 20A) for accommodating the rotation prevention means is arranged in the first spur gear (3) perpendicularly with respect to a longitudinal axis of the first spur gear (3) or at a predetermined angle obliquely from the radially inner region to the radially outer region.

5. The toothing arrangement (1) of claim 4, wherein an interlocking element of the rotation prevention means comprises a sleeve (17) arranged in the radial bore (16) of the first spur gear (3) or a pin (21) arranged in the radial bore (16) of the first spur gear (3), the sleeve (17) or the pin (21) of the interlocking element movable radially outward into the interlock position via a spring element (18) as a detent.

6. The toothing arrangement (1) of claim 4, wherein:
    the first spur gear (3) comprises a shaft or bearing receptacle;
    an interlocking element of the rotation prevention means comprises a pin (21);
    the first spur gear (3) comprises the radial through hole (20) for accommodating the pin (21); and
    a length of the pin (21) is dimensioned such that, after the first spur gear (3) has been mounted on a shaft or on a bearing (22), the pin (21) is configured as a detent in the interlock position via positive engagement with the shaft or the bearing.

7. The toothing arrangement (1) of claim 4, wherein an interlocking element of the rotation prevention means comprises a pin (21A) provided in the radial bore (16) or the through hole (20A), and the interlocking element comprises a snap ring (23) as a detent.

8. The toothing arrangement (1) of claim 4, wherein:
    an interlocking element of the rotation prevention means comprises a pin (21A) provided in the through bore (20A);
    an opposed indentation (24) is associated with the through hole (20A);

the opposed indentation (24) accommodates a spring element (18A) as a detent; and the spring element (18A) preloads the pin (21A) in the interlock position.

9. The toothing arrangement (1) of claim 3, wherein, in the interlock position of the interlocking element, a predetermined radial distance (19) is provided between an end of the interlocking element facing the thrust collar (7) and a root circle of the internal gearing (10) of the thrust collar (7).

10. The toothing arrangement (1) of claim 4, wherein, in the interlock position of the interlocking element, a predetermined radial distance (19) is provided between an end of the interlocking element facing the thrust collar (7) and a root circle of the internal gearing (10) of the thrust collar (7).

11. The toothing arrangement (1) of claim 1, wherein the at least one rotation prevention means is a plurality of rotation prevention means distributed over a circumference of the thrust collar (7).

12. A transmission (2) of a vehicle, comprising at least one toothing arrangement (1) of claim 1.

\* \* \* \* \*